May 6, 1930.  J. LEOPOLD  1,757,841
VALVE AND REGULATING MOVEMENT FOR ENGINES
Filed April 22, 1926   3 Sheets-Sheet 3
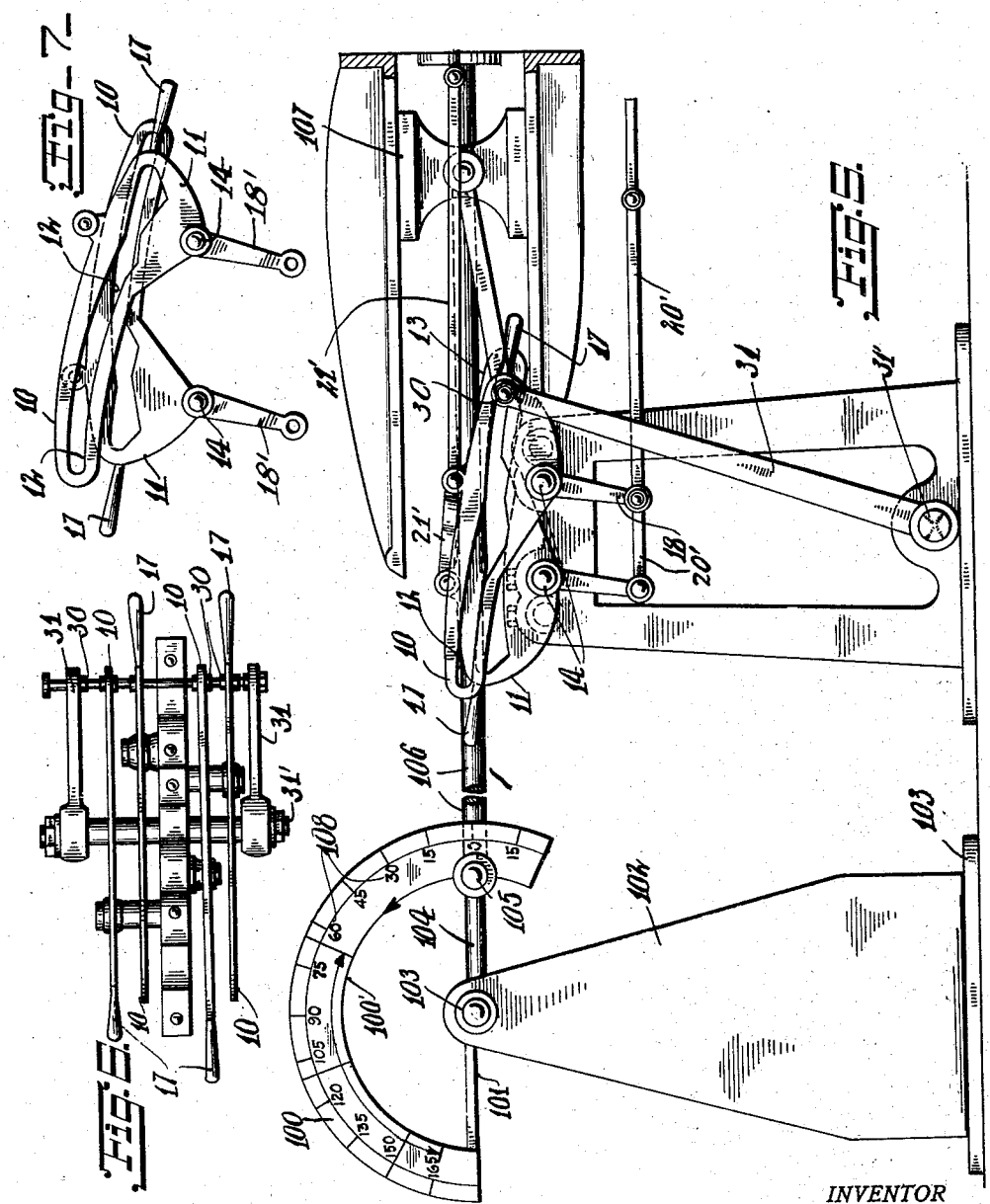
INVENTOR
Joseph Leopold
BY 
ATTORNEY Patented May 6, 1930

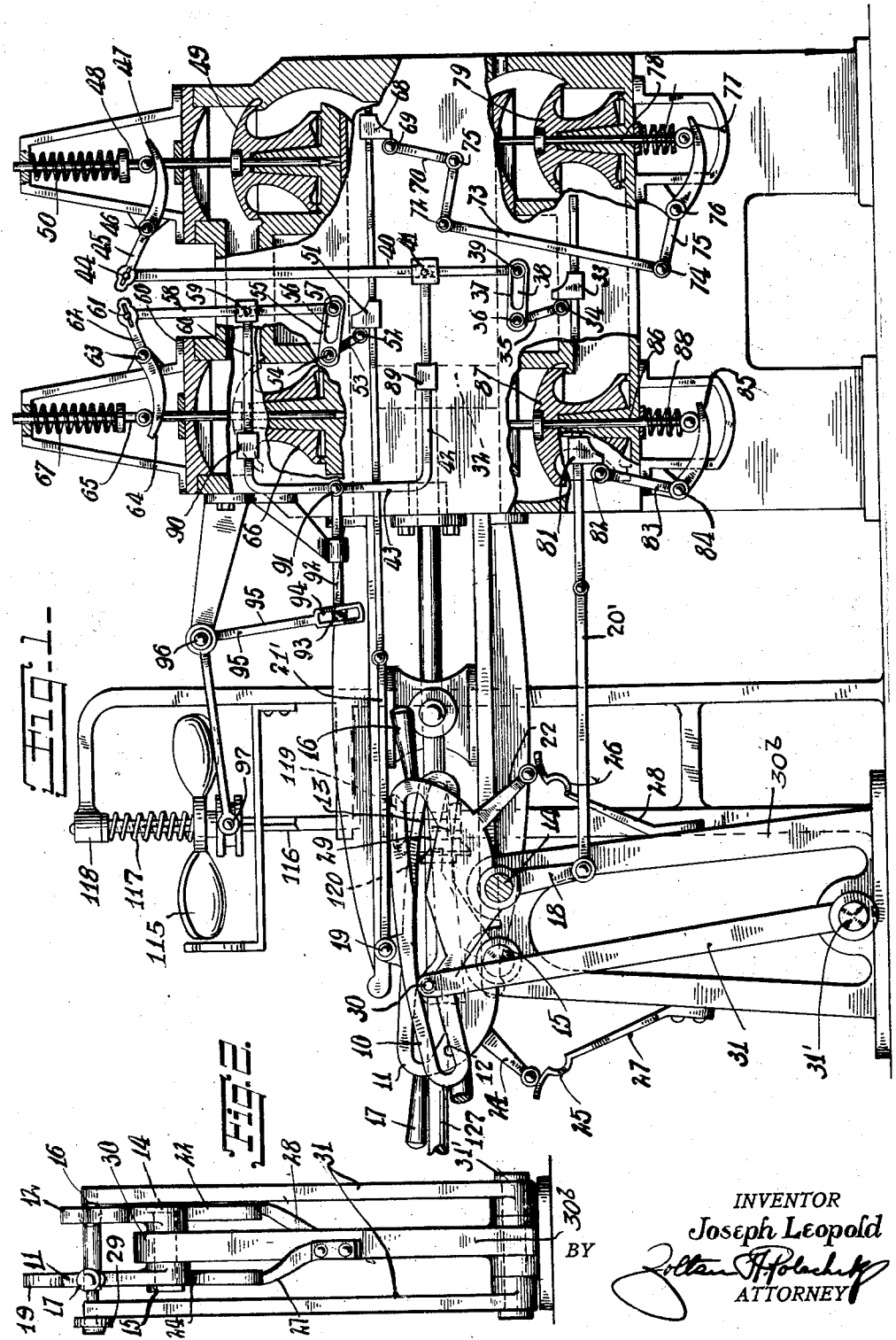

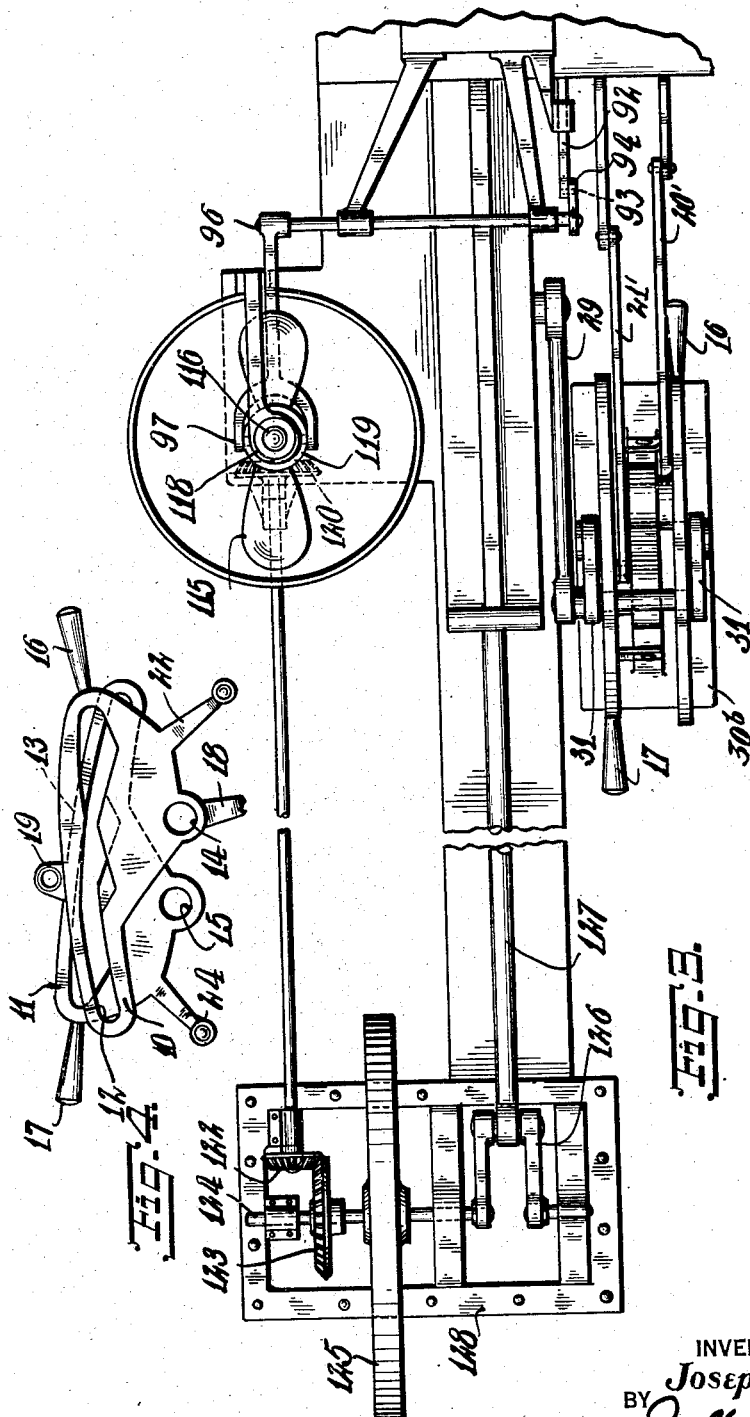

1,757,841

UNITED STATES PATENT OFFICE

JOSEPH LEOPOLD, OF NEW YORK, N. Y.

VALVE AND REGULATING MOVEMENT FOR ENGINES

Application filed April 22, 1926. Serial No. 103,764.

This invention relates generally to steam engines, and engines of all classes including internal combustion engines, the invention having more particular reference to a novel type of valve gear.

An object of the invention is the provision of a valve gear of novel construction and arrangement of parts.

For further comprehension of the invention and of the objects and advantages thereof, reference will be had to the following description, and accompanying drawings, and to the appended claims in which the various novel features of the invention are more particularly set forth.

Fig. 1 of the drawings, is a fragmentary side elevational view of a steam engine, partly in section, so as to expose certain working parts, showing my improved valve gear attached thereto.

Fig. 2 is an end elevational view of my improved valve gear operating mechanism, as shown in Fig. 1.

Fig. 3 is a fragmentary plan view of the device. Fig. 4 is a side detail view of the operating cams. Fig. 5 is a side elevational view, showing a modification of my improved valve gear.

Fig. 6 is a top plan view of the operating cams as illustrated in Fig. 5.

Fig. 7, is a side elevational detail view of the operation cams as used in connection with the modification of my improved valve gear.

It will be understood that the invention as hereinafter set forth and described eliminates the use of eccentrics, and the common necessary driving mechanism for the said eccentrics, which necessitate considerable friction surfaces, due to their excessive weight which thereby compels the use and waste of considerable power. This device uses cam plates which impart only linear motion, and are of comparative narrow construction which constitutes comparatively narrow bearing surfaces and less friction surfaces thereby requiring far less power to operate than the above referred to eccentrics and driving mechanism generally used. It will be further understood that the cam plates and connected mechanism may be made of steel stampings which are easily and cheaply manufactured and more readily assembled. It will be obvious that the construction as hereinafter set forth is adapted to extreme flexibility as regards timing of the various valves of the engine, and may therefore be readily adjusted to meet the particular characteristics of the engine.

As here embodied my improved valve gear comprises cam plates 10 and 11 having suitable cams cut or otherwise formed therein, preferably having elongated contours 12 and 13, pivotally attached, as at 14 and 15, respectively, to standard $30^b$, and having handles 16 and 17, respectively, to enable the cam plates to be moved for effecting changes in the timing of the valves as hereinafter set forth, and provided with levers 18 and 19, respectively, to which are pivotally attached the valve operating rods 20' and 21', respectively. The cam plates 10 and 11, are provided with depending elements 22 and 24, respectively, having suitable shaped extremities to engage suitable shaped recesses, 25 and 26, formed at or near the free extremities of the spring members 27 and 28, respectively, which are attached at their other extremities, to standard $30^b$. It should be understood that the pivotally connected extension 29 of the piston rod, of the said steam engine has pivotally attached thereto, as at 30, the outer extremity of a cam rod 31, which is pivoted, as at 31', to standard $30^b$. The above described construction is such as will permit the said piston rod extension 29, when reciprocated, by the movement of the piston 32, of the said steam engine, to reciprocate the said valve operating rods 20' and 21', it should be further understood that the said depending elements 22', and 24, of the said cam plate 11, may be engaged in the recesses 25 and 26 of the spring members 27 and 28, for the purpose of retaining the valve mechanism substantially at rest at the end of each reciprocation of the piston.

The valve operating rod 20', has attached thereto a block 33, adapted to engage the free extremity 34, of a bell crank 35, pivoted, as at 36, to any convenient part of the said steam engine, and having an arm 37, provided with an elongated slot 38, to engage the free extremity 39, of a valve rod proper 40, which is slidably mounted as at 41 in the arm 42 of a U-shaped member, 43. The said valve rod proper, has a pin engaging in a slot in one extremity of a lever 45, pivoted as at 46, to the said steam engine, and having its other extremity 47, suitably shaped to engage, the valve stem 48, which is attached to the intake valve 49, of the said steam engine. The above described construction is such as will permit the said valve operating rod 20', when reciprocated, as hereinbefore described, to open the said intake valve 49, it should be understood, that the valve spring 50, of the said steam engine, will close the said intake valve 49.

The valve operating rod 21', has attached thereto, a block 51 adapted to engage the free extremity 52, of a bell crank 53, pivoted as at 54, to any convenient part of the said steam engine, and having an arm 55, provided with an elongated slot 56, to engage the free extremity 57, of a valve rod proper 58, which is slidably mounted as at 59 in the arm 60, of the said U-shaped member 43. The said valve rod proper 58 has a pin 61 engaging in a slot in one extremity of a lever 62, pivoted as at 63, to the said steam engine, and having its other extremity 64, suitably shaped to engage the valve stem 65, which is attached to the intake valve 66, of the said steam engine. The above described construction is such as will permit the said valve operating rod 21', when reciprocated, as hereinbefore described, to open the said intake valve 66, it should be understood that the valve spring 67, will close the said intake valve 66.

The valve operating rod 20', has also attached thereto, a block 81, adapted to engage the extremity 82, of a bell crank 83, pivoted as at 84 to the said steam engine, and having its other extremity suitably formed, as at 85, to engage the valve stem 86, attached to the exhaust valve 87, of the said steam engine. The above described construction is such as will permit the said valve operating rod 20', when reciprocated, as hereinbefore described, to open the said exhaust valve 87, it should be understood that the valve spring 88, of the said steam engine, will close the said valve.

The valve operating rod 21' has also attached thereto, a block 68, adapted to engage the extremity 69, of a bell crank 70, pivoted, as at 71, to the said steam engine, and having pivotally attached, as at 72, at its other extremity, a valve rod proper 73, which is also pivotally attached, as at 74, to one extremity of a lever, 75, pivoted, as at 76, to the said steam engine, and having its other extremity 77, suitably shaped to engage the valve stem 78, which is attached to the exhaust valve 79, of the said steam engine. The above described construction is such as will permit the said valve operating rod 21', when reciprocated, as hereinbefore described, to open the said exhaust valve 79, it should be understood that the valve spring 80, of the said steam engine, will close the said exhaust valve 79.

The said arms 42 and 60, of the U-shaped member 43, are provided with suitable bearings 89 and 90, respectively, suitably attached to the said steam engine, so as to permit the said U-shaped member 44, to reciprocate, when the said valve rods proper 40 and 58 are reciprocated, the U-shaped member 43, has attached thereto, as at 91, an extending member 92, provided with a pin 93, located at or near its outer extremity, and adapted to engage an elongated recess, 94, cut or formed in the free extremity, of a bell crank 95, pivoted as at 96, to the said steam engine. It should be understood that the other extremity 97, of the bell crank 95, is suitably attached to a governor, such as commonly used on steam engines, as a means of regulating the speed of the said steam engine. This governor consists of a horizontal propeller 115 slidably mounted on the square shaft 116, normally urged downwards by spring 117, and connected with the extremity 97 of bell crank. When the shaft 116 revolves the propeller moves upwards against the action of spring 117. The square shaft 116 has round portions mounted in bearing 118. A bevel gear 119 is fixed onto shaft 116 and meshes with gear 120 on shaft 121 provided with a second gear 122 meshing with gear 123 on shaft 124 having a flywheel 125 and a crank 126 connected to rod 127 which is connected to the cross head of the engine. Standard 128 supports the shaft 124.

It should be further understood, that the said governor, by means of the above described connected parts of my improved valve gear, will regulate the said opening of the said intake valve, of the said steam engine, by sliding the said extremities 57 and 39, of the valve rods proper, 58, and 40, respectively, in the elongated slots 56, and 38, respectively.

Referring in particular to Fig. 5, of the accompanying drawings, in which I have illustrated a further modification of my improved device; a pair of valve operating rods 20' and another pair of valve operating rods 21' are operatively connected to individual valves, that is each rod is connectible to one valve only. These rods, four in all are connected to the cam plates provided with two arms and two lugs for this purpose.

The indicating mechanism, comprises a protractor member 100, having its contour shaped or formed on the arc of a circle, and supported by an arm 101, attached to the standard 102, and extending therefrom, the standard 102 being provided with a suitable base 102, as a means of attaching same adjacent to the engine, and has hinged thereto, as at 103, or pivotally attached thereto, a lever 104, having pivotally attached thereto, as at 105, concentric with and adjacent to the inner edge 100' of the protractor member 100, a rod 106, pivotally attached to the cross head 107 of the engine. The protractor member 100 has suitably affixed thereto, graduations 108, designating in degrees the movement of the crosshead 107, for aiding the setting of the valve mechanism. The lever 104 is operatively connected with the cross head and is adapted to indicate on the graduated protractor the position at which the cross head rests. Thus, it should be understood that in setting the valve mechanism the cross head may be moved until the lever 104 is directed to a predetermined graduation. With the cross head in the desired position the valve mechanism may be set in correspondence to the position of the cross head. In operation, the cross head of the engine reciprocates, causing the governor propeller to rotate and move bell crank 95 so as to move the U-shaped member 43. This changes the position of extremity 57 relative to the pivot 54, end extremity 39 relative to pivot 36. The reciprocation of the cross head causes the cam plates to move up and down about their pivots and this operates the valves of the engine. The extent of movement of the inlet valves is determined by the position of the U-shaped member 43.

Having thus described my invention, what I claim as new and desire to protect by Letters Patent of the United States is as follows:—

1. In an engine of the class described, inlet valves arranged for controlling the fuel supply to the engine, a U-shaped member slidably mounted on the engine, a governor operated by the engine and arranged for moving the U-shaped member forwards or rearwards according to the speed of the engine, a rod connected to each arm of the U-shaped member, and the top ends of these rods being connected for operating the said inlet valves upon movements of the rods, bellcranks pivotally mounted on the engine, and having slots in one of their arms, the bottoms of the said rods being engaged in these slots, the said engine having a cross-head, cams connected for operating the cross head, valve operating rods connected with the cams, and blocks fixed on the valve operating rods and engageable upon motion against the free ends of the bellcranks for moving the rods of the U-shaped member thru distances as determined by the position of the U-shaped member.

2. In an engine of the class described, inlet valves arranged for controlling the fuel supply to the engine, a U-shaped member slidably mounted on the engine, a governor operated by the engine and arranged for moving the U-shaped member forwards or rearwards according to the speed of the engine, rods connected with the U-shaped member, and the top ends of these rods being connected for operating the said inlet valves upon movements of the rods, bellcranks pivotally mounted on the engine, and having slots in one of their arms, the bottoms of the said rods being engaged in these slots, the said engine having a cross-head, cams connected for operating the cross-head, valve operating rods connected with the cams, and clocks fixed on the valve operating rods and engageable upon motion against the free ends of the bellcranks for moving the rods of the U-shaped member thru distances as determined by the position of the U-shaped member.

In testimony whereof I have affixed my signature.

JOSEPH LEOPOLD.